United States Patent [19]
Deutschenbaur et al.

[11] Patent Number: 6,145,162
[45] Date of Patent: Nov. 14, 2000

[54] SUCTION HEAD FOR AN APPARATUS FOR SUCKING FLUID MEDIA

[75] Inventors: Paul Deutschenbaur, Germering; Goran Golubovic, Munich, both of Germany

[73] Assignee: Hilti Aktiengesellschaft, Schaan, Germany

[21] Appl. No.: 09/256,745

[22] Filed: Feb. 24, 1999

[30] Foreign Application Priority Data

Feb. 26, 1998 [DE] Germany ............................ 198 07 812

[51] Int. Cl.$^7$ ...................................................... A47L 9/02
[52] U.S. Cl. ........................ 15/339; 15/415.1; 144/252.1
[58] Field of Search ................... 15/339, 415.1; 175/213; 83/100; 144/252.1; 408/67; 409/137

[56] References Cited

U.S. PATENT DOCUMENTS

| | | | |
|---|---|---|---|
| 2,859,940 | 11/1958 | Brochetti et al. | 15/339 |
| 3,033,298 | 5/1962 | Johnson | 175/209 |
| 3,924,696 | 12/1975 | Horlin et al. | 175/213 |
| 4,184,226 | 1/1980 | Loevenich | 15/339 |
| 4,409,699 | 10/1983 | Moorhouse | 15/339 |
| 5,356,245 | 10/1994 | Hosoi et al. | 408/67 |
| 5,632,579 | 5/1997 | Susnjara | 409/137 |
| 5,983,445 | 11/1999 | Baker | 15/339 |
| 5,987,698 | 11/1999 | Koenig et al. | 15/339 |

FOREIGN PATENT DOCUMENTS

| | | |
|---|---|---|
| 2324401 | 4/1977 | France . |
| 8813719 | 9/1989 | Germany . |
| 328246 | 4/1930 | United Kingdom . |

*Primary Examiner*—Robert J. Warden, Sr.
*Assistant Examiner*—Theresa T. Snider
*Attorney, Agent, or Firm*—Brown & Wood, LLP

[57] ABSTRACT

A suction head for a suction device including an annular support member (1), an annular guide member (2) releasably connectable with the support member (1), a suction nipple (51) connected with the support member (1), and an annular seal (6) projecting beyond a first free end of the support member (1) in an axial direction, with the guide member having a first end region (22) projecting beyond the first free end of the support member (1) in the axial direction by a length which at most corresponds to a length by which the seal projects beyond the first free end of the support member (1).

10 Claims, 1 Drawing Sheet

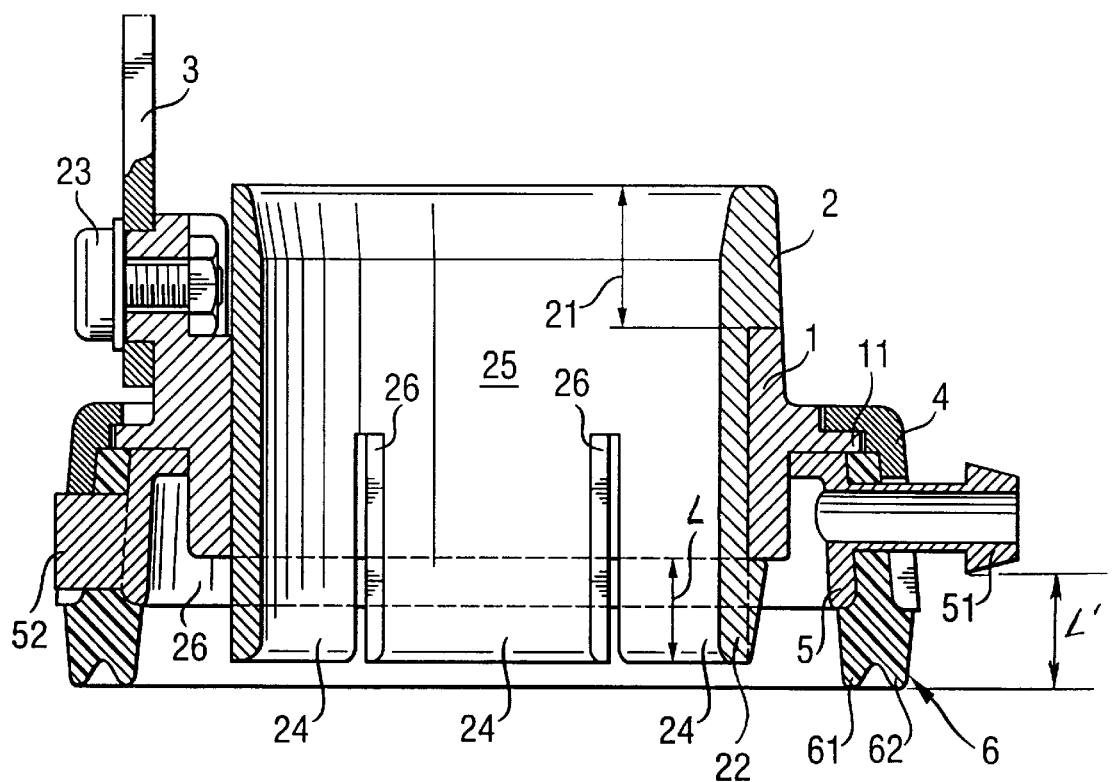

SUCTION HEAD FOR AN APPARATUS FOR SUCKING FLUID MEDIA

BACKGROUND OF THE INVENTION

1. Field of the Invention

The present invention relates to a suction head for a suction device and including an annular support member, an annular guide member releasably connectable with the support member, a suction nipple connected with the support member, and an annular seal projecting beyond a first free end of the support member in an axial direction.

2. Description of the Prior Art

During the formation of bores in hard construction components formed of concrete, stone, steel and the like, a cooling medium is used for cooling a drill and for removal of drillings. In order to keep the region around the working position as clean as possible, e.g., suction apparatuses with a suction head are used. The suction head surrounds the drilling side end region of a drill, seals the working position outwardly, and has a nipple with which the suction head is connected with an external vacuum-producing device or apparatus.

Such a suction head is disclosed, e.g., in German Utility Model DE-GM 8813719. The disclosed suction head has an annular support member which is secured on a guide rod. A suction nipple is secured in the support member with a threaded connection. A seal projects, in a drilling direction, beyond the drilling side free end of the support member. A spacer sleeve, which serves for receiving a detachable sleeve-shaped guide member, adjoins the support member at its side facing in a direction opposite to the drilling direction. The guide member has a bottom with a hole therein the diameter of which substantially corresponds to an outer diameter of a drill with which the suction head cooperates.

Axial and radial loads, which occur during formation of a bore, lead to a rapid wear of the seal. In addition, the suction head cannot be pulled over the drill as a guide because the suction head, upon contacting the rotatable drill, is displaced sidewise due to elastic characteristics of the seal.

Accordingly, an object of the present invention is a suction head which can be economically produced, which would insure a precise guidance of a drill during a drilling process, and the seal of which would be subjected to less wear.

SUMMARY OF THE INVENTION

This and other objects of the present invention, which will become apparent hereinafter, are achieved by providing a suction head the guide member of which has a first end region projecting beyond the first free end of the support member in the axial direction by a length which at most corresponds to a length by which the seal projects beyond the first free end of the support member in the axial direction.

With a suction head according to the present invention, in which the first end region of the guide member projects, in the drilling direction, beyond the support member, a complete compression of the seal is prevented. Thereby, action of high loads on the seal in drilling direction is prevented. This results in a very small wear of the seal. A further advantage of the suction head according to the present invention consists in a possibility of using the suction head as tapping or centering auxiliary means during the drilling process because the drilling side end surface of the first end region of the guide member can form a frictional connection with the surface of a constructional component in which a bore is to be formed. Because of their frictional connection, no radial loads act on the seal. This favorably influences the durability of the seal.

To provide a guide region of the guide member for the drill having a most possible length, advantageously, a second end region of the guide member, opposite to the first end region, likewise projects, in the axial direction, beyond the second end of the support member facing in the direction opposite to the drilling direction.

An axial mounting of the guide member on the support member without any additional connection elements is preferably achieved by providing a guide member the end regions of which have a radial extent that extends beyond the inner diameter of the support member. At least one of the two end regions of the guide member is so deformable in a radial direction that the radial extent of the at least one of the two regions, in its deformable condition, does not project beyond the inner diameter of the support member.

The radially deformable end region of the guide member makes a snap-on mounting of the guide member on the support member possible.

An insertion of the guide member in the support member without the use of an auxiliary tool becomes possible when, advantageously, the outer contour of the radial extent of the radially deformable end region of the guide member narrows toward the free end of the support member.

For manufacturing reasons and to provide for an easy deformability of the radially deformable end region of the guide member, advantageously the deformable end region is formed of a plurality of clamping elements preferably uniformly distributed over the circumference of the support member.

In order to prevent damage of the seal which can be caused by friction during rotation of the suction head relative to the surface of a constructional component, in which a bore is being formed, preferably, the seal is rotatably supported on the support member.

In order to impart high rigidity to the sealing lips and to the entire seal, advantageously, the seal is arranged, at least partially, between support rings which are rotatably supported against a flange-like portion of the support member.

A rapid mounting of the seal on the support member and a rapid dismounting of the seal are advantageously achieved by providing at least one of the support rings with at least one locking element formlockingly engageable with the seal and the second support ring.

A particular good sealing of the working position is advantageously achieved when the seal has, at its free end, two annular, radially spaced, sealing lips.

BRIEF DESCRIPTION OF THE DRAWINGS

The features and objects of the present invention will become more apparent, and the invention itself will be the best understood from the following detailed description for the preferred embodiment when read with reference to the accompanying drawings, wherein:

Single FIGURE shows a suction head according to the present invention for an apparatus for sucking fluid media.

DETAILED DESCRIPTION OF THE PREFERRED EMBODIMENT

A suction head according to the present invention, which is shown in the drawing, includes an annular support member 1, an annular guide member 2, an annular seal 6, an external support ring 4, an internal support ring 5, and a suction nipple 51 secured in the internal support ring 5. A connecting conduit (not shown) can connect the suction nipple 51 with, e.g., a suction device (not shown).

The annular guide member has central through-opening 25 the inner diameter of which substantially corresponds to an outer diameter of a drill (not shown) on which the suction head is to be mounted. The through-opening 25 expands toward a free end of the guide member 2 facing in a direction opposite to the drilling direction. The two opposite end regions 21, 22 of the guide member 2 extend beyond the inner diameter of the support member 1 in the radial direction and have each a shoulder abutting a respective end side of the support member 1. The first end region 22, which faces in the drilling direction and projects beyond the support member 1 by a length L, is formed by a plurality of elastic clamping segments 24 which are uniformly distributed over the circumference of the guide member 2. For removing the guide member 2 from the support member 1 or for inserting the guide member 2 therein, the elastic clamping segments 24 are radially compressed. To facilitate the insertion of the guide member 2 in the support member 1, the outer contour of the first, facing in the drilling direction, end region 22 or the clamping segments 24 narrows in the drilling direction. A connection member 23 connects the support member 1 with a guide rod 3.

Spaces 26, which are formed between the clamping segments 24, are so dimensioned that a cooling medium, in which drillings may be dispersed, can flow from the inner side of the support member 1 into an annular chamber, which is formed by the outer side of the support member 1 and by the interior of the support ring 5 and the inner side of the seal 6. From this chamber, the cooling medium can be sucked through the suction nipple 51. In case the guide member 2 is supported in the support member 1 with a possibility of rotation by 180°, indentations, not shown, can be provided in the end surface of the second end region 21 of the guide member 2, which faces in the direction opposite to the drilling direction. The second end region 21 is not radially deformable.

The support member 1 has a flange-shaped portion 11 which provides support for the rotatable support rings 4, 5. The inner support ring 5, which is spaced radially form the support member 1, has a plurality of locking elements 52 extending radially outwardly. The elastic seal has a plurality of through-holes corresponding to a number of locking elements 52. The locking elements 52 project through the openings formed in the seal 6 when the seal 6 abuts the outer side of the inner support ring 5. The outer support ring 4 serves for securing the seal 6 to the inner support ring 5. The outer support ring 4 has a number of locking openings corresponding to the number of the locking elements 52. The locking openings in the outer support ring 4 can be open toward the free end of the outer support ring 4 which faces in the drilling direction. The locking openings, which are formed in the outer support ring 4, can be brought in a formlocking engagement with the locking elements 52 by displacing the outer support ring 4 in the drilling direction.

The inner support ring 5 can be provided, e.g., with four locking elements 52 uniformly distributed over its circumference. These locking elements 52 can be clearly seen by a tool operator and, therefore, can be used as positioning auxiliary means for aligning a drill in accordance with a marking provided in a to-be-treated constructional component. The marking can be, e.g., in form of two vertical lines intersecting each other with the intersection point marking, e.g., a center of a bore to be formed in a constructional component.

The seal 6, which extends beyond the support member 1 by a length L' and the guide member 2 in the drilling direction, has two radially spaced lips 61, 62 having, e.g., the same cross-section. The length L that the first end region 22 projects beyond the support member 1 at most corresponds to the length L' that the seal 6 extends beyond the support member 1.

The connection between the support member 1 and the guide rod 3 can, e.g., be so formed that the support member 1 and, thus, the entire suction head could be pivoted about a longitudinal axis of the locking elements 52 or about an axis extending transverse to the drilling direction.

All of the components of the suction head can be formed of a lightweight material such as, e.g., aluminum or plastics.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A suction head for a suction device, comprising an annular support member (1); an annular guide member (2) releasably connectable with the support member (1); a suction nipple (51) connected with the support member (1); and an annular seal (6) projecting beyond a first free end of the support member (1) in an axial direction, the guide member having a first end region (22) projecting beyond the first free end of the support member (1) in the axial direction by a length which at most corresponds to a length by which the seal projects beyond the first free end of the support member (1).

2. A suction head according to claim 1, wherein a second end region (21) of the guide member (2), which is opposite to the first end region thereof, likewise projects beyond a second free end of the support member (1), which is opposite to the first free end of the support member (1), in the axial direction.

3. A suction head according to claim 2, wherein both first and second end regions (22, 21) of the guide member (2) have a radial extent that extends beyond an inner diameter of the support member (1), and wherein at least one of the two regions (22, 21) of the guide member (2) is so deformable in a radial direction that the radial extent of the at least one of the two regions (21, 22), in a deformable condition thereof, does not project beyond the inner diameter of the support member (1).

4. A suction head according to claim 3, wherein an outer contour of the radial extent of the radially deformable end region (22) of the guide member (2) narrows toward the first free end of the support member (5).

5. A suction head according to claim 3, wherein the radially deformable end region (22) of the guide member (2) is formed of a plurality of clamping segments (24) distributed over circumference thereof.

6. A suction head according to claim 5, wherein the clamping segments (24) are uniformly distributed over the circumference of the radially deformable end region (22).

7. A suction head according to claim 1, wherein the seal (6) is pivotally supported on the support member (6).

8. A suction head according to claim 7, further comprising two spaced support rings (4, 5) rotatably supported on a flange-like portion (11) of the support member (1), the seal (6) being at least partially arranged between the two support rings (4, 5).

9. A suction head according to claim 8, wherein at least one of the two support rings (4, 5) has at least one first locking element (52) formlockingly engageable with the seal (6) and another of the two support rings (4, 5).

10. A suction head according to claim 1, wherein the seal (6) has at a free end thereof two, radially spaced annular sealing lips (61, 62).

* * * * *